United States Patent [19]
Fisher et al.

[11] 3,796,106
[45] Mar. 12, 1974

[54] METHOD AND APPARATUS FOR MAKING SPROCKETS AND/OR GEARS

[75] Inventors: Harold R. Fisher, Ithaca; Thomas H. McGough, Groton; Charles M. Borden, Trumansburg, all of N.Y.

[73] Assignee: Borg-Warner Corporation, Chicago, Ill.

[22] Filed: June 29, 1971

[21] Appl. No.: 157,903

[52] U.S. Cl............................. 74/243 R, 74/230.8
[51] Int. Cl. ...................... F16h 55.30, F16h 55/44
[58] Field of Search........ 74/230.8, 243 R; 29/159.2

[56] References Cited
UNITED STATES PATENTS
2,931,094   4/1960   Teerlink....................... 74/230.8 X
3,587,347   6/1971   Hanzi et al............................ 74/759

FOREIGN PATENTS OR APPLICATIONS
255,591   7/1926   Great Britain........................ 74/243

*Primary Examiner*—Arthur T. McKeon
*Attorney, Agent, or Firm*—Donald W. Banner

[57] ABSTRACT

Sheet metal sprockets and/or gears are manufactured by cold metal working comprising die drawing a disc into a cup-shaped member while simultaneously forming the sprocket teeth thereon. Specially constructed apparatus is used to so cold form the sprocket.

2 Claims, 11 Drawing Figures

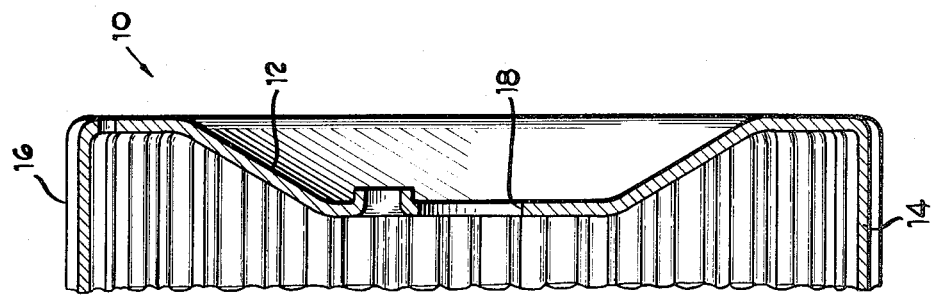
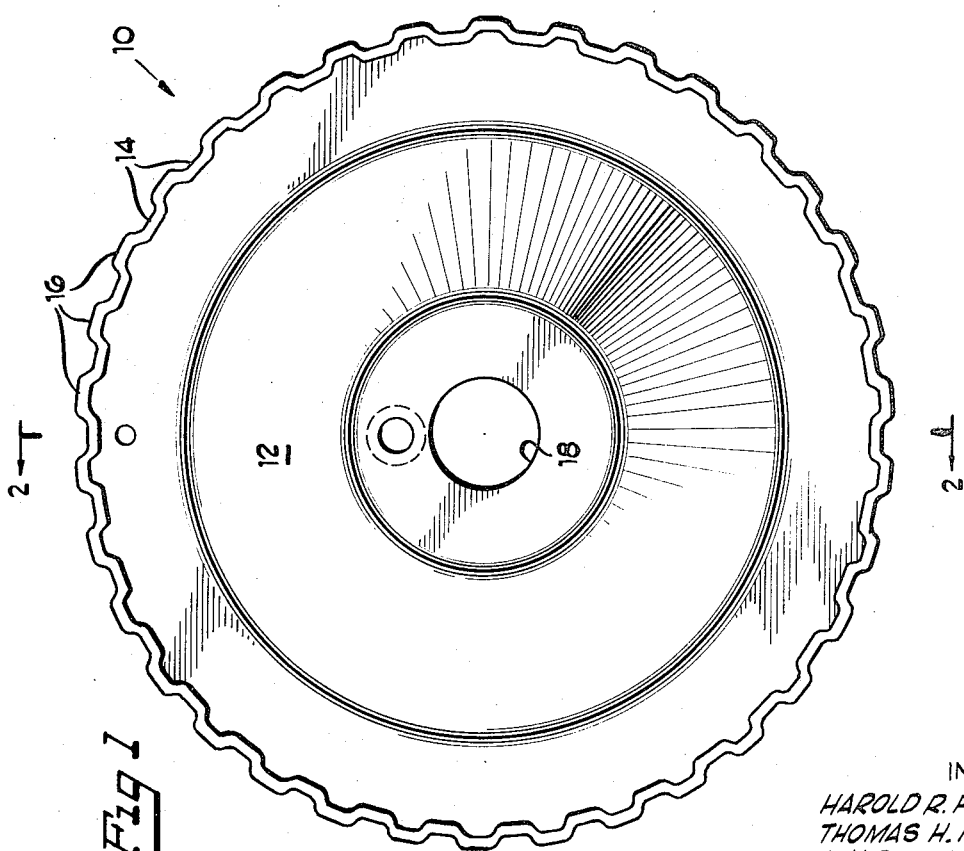

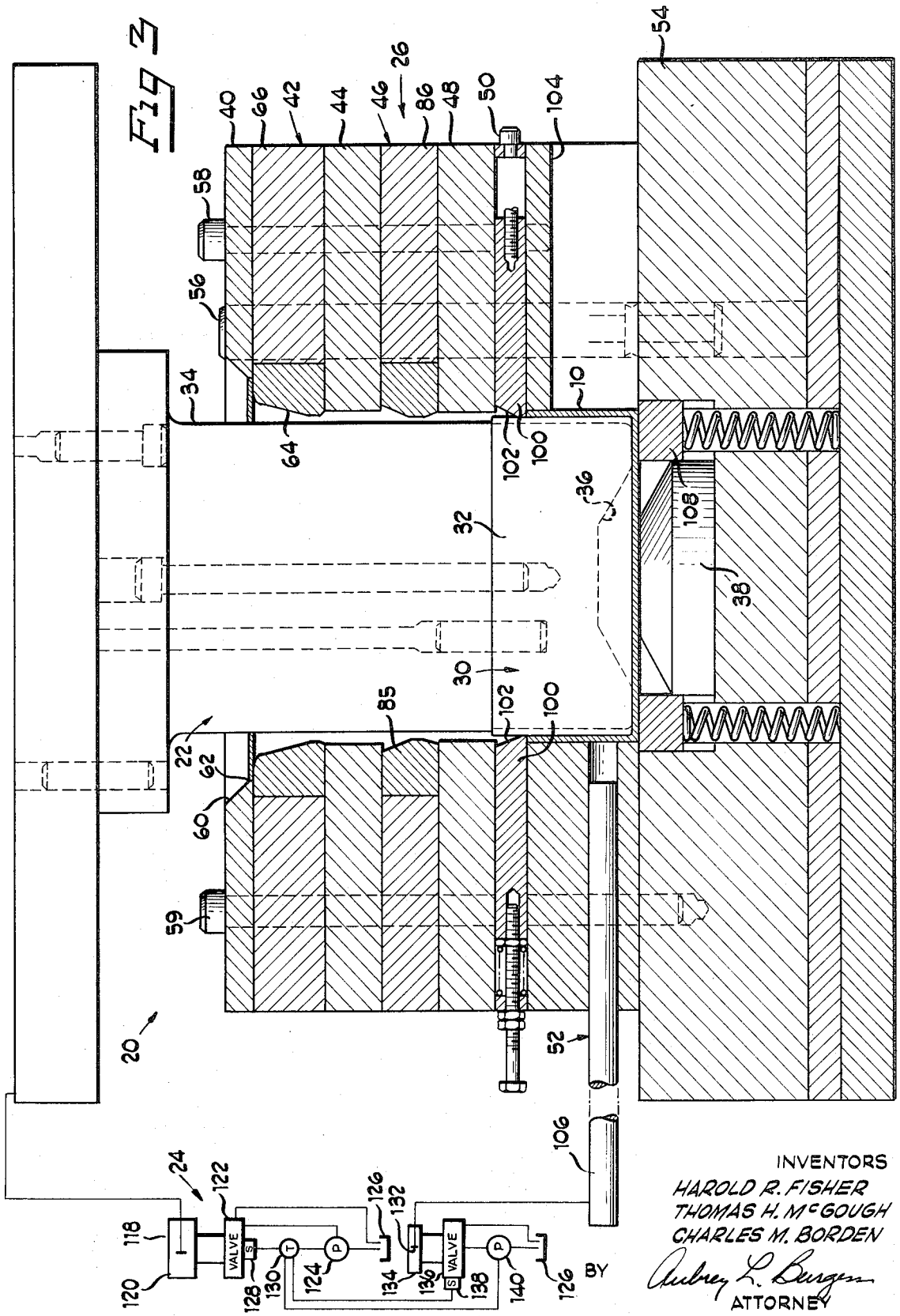

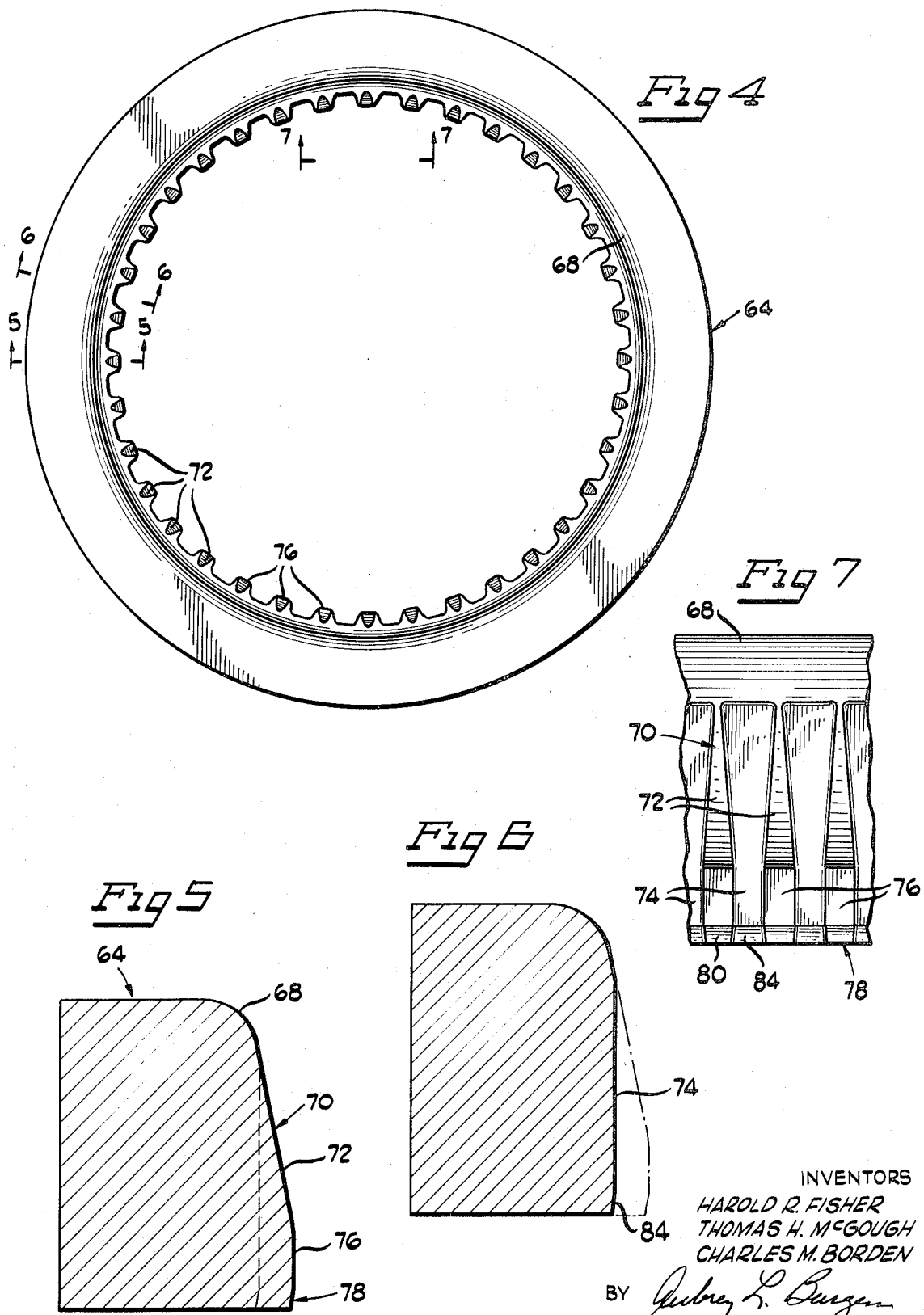

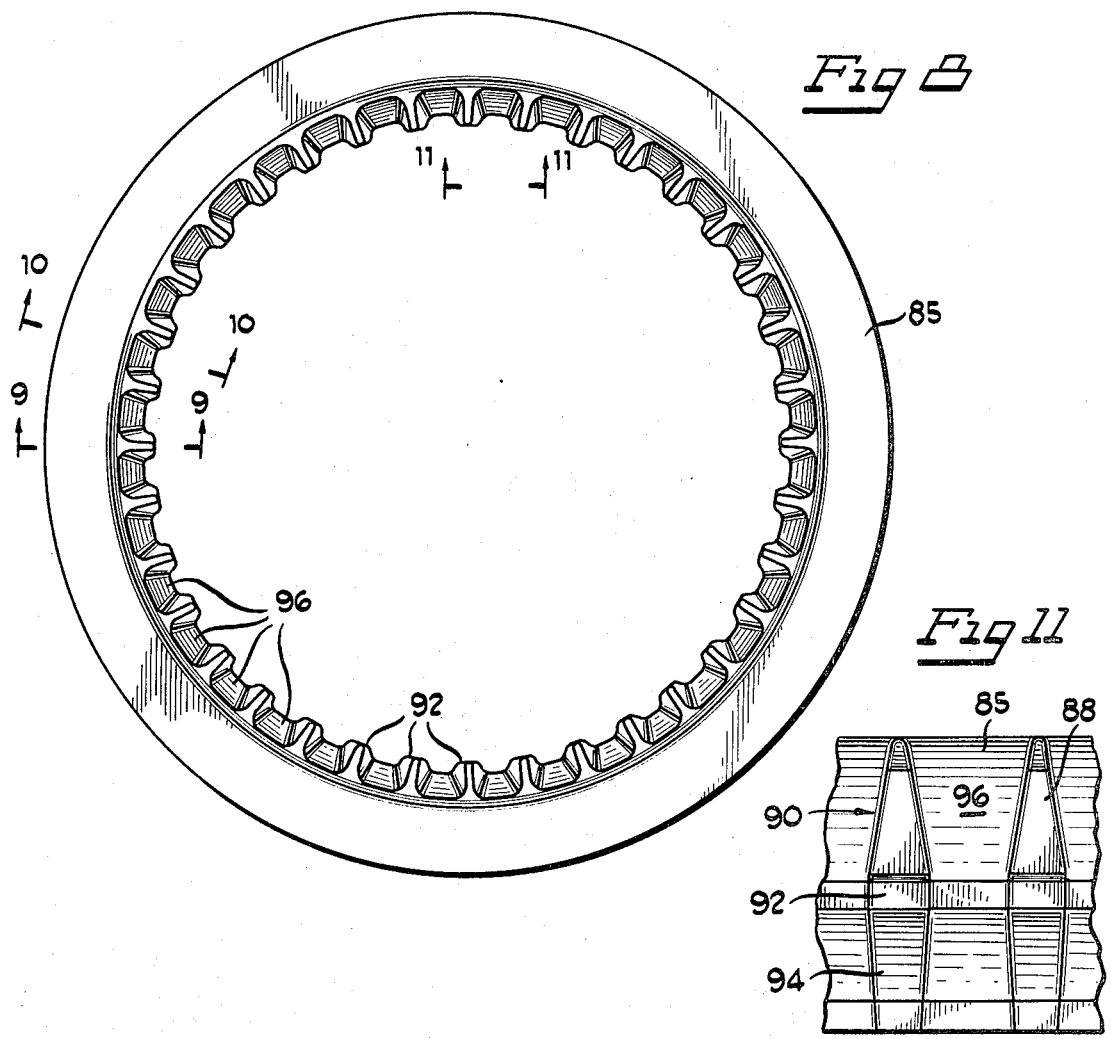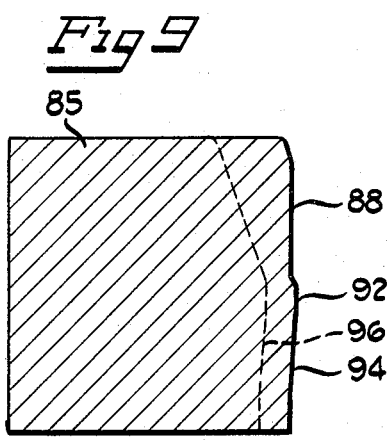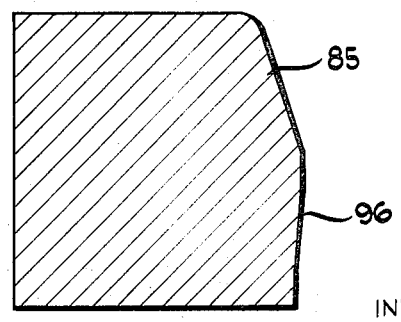

METHOD AND APPARATUS FOR MAKING SPROCKETS AND/OR GEARS

BACKGROUND OF THE INVENTION

Sprockets and/or gears are generally composed of a central web having an enlarged hub and a surrounding web from which radial teeth project. The hub is formed to receive a drive or driven shaft and the sprocket or gear is generally keyed to the shaft, or affixed thereto by one or more set screws. Usually sprockets and gears are cast metal or formed from cast metal blanks by metal forming and cutting operations.

THE INVENTION

According to this invention, sprockets and/or gears are cold formed from sheet metal. Hereafter, when sprockets or gears are mentioned, it is to be understood that the procedure applies to the manufacture of either part. To follow the teachings of this invention, sheet stock is blanked to form discs from which the finished sprockets are cold formed. Each disc is placed in a die assembly and is die formed to final shape in one operation. No finish trimming of the sprocket is required as it emerges from the die forming apparatus.

The die-formed sprocket comprises a central disc and an axially extending rim portion having projecting teeth; the thickness of the metal is substantially the same throughout the disc portion and is generally less in the tooth or rim portion. The disc portion thickness is usually substantially the same as that of the disc from which the part is formed.

If desirable, the hub may be pierced and dished during the forming operation or such forming step may be later performed. Piercing of the hub is necessary to provide an opening for receiving a drive or driven shaft. Various collars or the like can be used, if necessary, for providing the driving connection between the sprocket and the shaft. Dishing of the sprocket hub may be required to avoid a bending moment on the face which could cause failure of the sprocket from flexure.

To form a sprocket, novel apparatus is used. The apparatus comprises a male die or punch having a toothed periphery corresponding to the internal configuration of the toothed periphery of the sprocket and a female die assembly of special construction.

In addition to a ring or jig for locating and centering a punched sheet disc, there is provided at least one annular forming die having a plurality of forming sections which may be referred to as a transition portion, a lead-in tooth forming portion, a primary tooth forming portion and a relief portion.

The transition portion is a curved surface for providing a smooth transition of the disc into a cup-shape during forming.

The lead-in tooth forming portion is provided with projections equal to the number of tooth roots of the finished sprocket and which taper from the curved transition surface to full tooth form at the juncture of this portion with the primary tooth forming portion in which the projections are substantially uniform.

In the relief portion, the projections taper in the opposite direction as in the lead-in portion and to a much lesser extent.

The tapered portions or sections of the die have been found desirable in order to maintain a film of lubrication to reduce wear on the die and also to prevent or materially reduce the welding of metal particles from the work piece to the die.

At times, because of tooth form, it has been necessary to use two female dies. In such case, the first die is such as to form the sprocket close to finish size by forming the tooth width and diameter oversize. In the second die, the metal is forced circumferentially sideways and radially inwardly to move metal to obtain the proper tooth form.

In addition, the die assembly may be provided with a dished punch to shape the hub portion of the sprocket into a dish shape, and also with stripper means to strip the finished sprocket from the male die. Ejection means can also be provided.

THE DRAWINGS

FIG. 1 is a plan view of a typical sprocket made according to this invention;

FIG. 2 is a sectional view of the sprocket through line 2—2 of FIG. 1;

FIG. 3 is a partial sectional view of the forming dies of this invention, showing schematically means for moving the male die relative to the remainder of the assembly;

FIG. 4 is a plan view of a first draw die;

FIG. 5 is a sectional view on line 5—5 of FIG. 4;

FIG. 6 is a sectional view on line 6—6 of FIG. 4;

FIG. 7 is a partial view taken on line 7—7 of FIG. 5;

FIG. 8 is a plan view of a finish draw die;

FIG. 9 is a sectional view taken on line 9—9 of FIG. 8;

FIG. 10 is a sectional view taken on line 10—10 of FIG. 8, and

FIG. 11 is a partial view taken on line 11—11 of FIG. 8.

DETAILED DESCRIPTION

Referring now to FIGS. 1 and 2 of the drawing, there is shown a finished sheet metal sprocket 10 which includes a hub portion shown here as being dished inwardly, as at 12, and an axially disposed tooth rim portion 14. The rim portion 14 is formed with projecting teeth 16 and the hub portion of 10 has a central opening 18 to receive a drive or driven shaft (not shown). Appropriate collars can, if necessary, be used to secure the sprocket to the shaft.

FIG. 3 illustrates the die assembly generally identified as 20 which comprises a male die 22 connected to the slide of a press arrangement generally identified as 24, shown schematically, and a female die assembly 26 attached in a suitable fashion to the table of the press 24. The press 24 may be a mechanical or hydraulic power press or a drop hammer press or a like pressing type of apparatus. The schematic is a hydraulic system and will be later described.

The male die 22 is an elongated member having a working portion 30 with a toothed configuration 32, the teeth of which correspond generally to the internal configuration of the rim of the sprocket 10, and a reduced generally circular portion 34 connected to the slide of the press. The working portion 30 is of sufficient length to properly form the metal of the sprocket. The bottom of the die 22 may be dished, as at 36 to cooperate with a die part 38 in the female die assembly 26 to dish the hub of the sprocket.

The female die assembly 26 is constructed of a locating ring 40, a first die member assembly 42, a spacer 44, a second female die member assembly 46, a spacer 48, a stripper mechanism 50, an ejection arrangement 52 and a base 54 which has therein the die part 38, previously referred to. The parts 40, 42, 44, 46, 48 and 50 are aligned by pins 56 and connected by bolts 58 and to the base 54 by bolts 59.

The locating ring 40 has a conical surfaced opening 60 directed inwardly toward a cylindrical opening 62 of a size to receive a disc to be formed into a sprocket 10. The disc rests on a top surface of the die member 42.

The first female die member assembly 42 includes a ring die 64 (see FIGS. 4, 5, 6 and 7) which is retained in a die member holder 66 and, as previously stated, has four portions, a transition portion which comprises a curved surface 68 for providing a smooth transition of the disc into the sprocket, a lead-in section 70 having tapered tooth root forming projections 72 extending inwardly toward the male die 22 for shaping the disc, a primary tooth forming portion 74 having uniform projections 76 for finish forming the tooth roots of the sprocket to rough size, and an exit or relief section 78 having a reverse taper on the projections 80, the reverse taper being provided for the reasons set forth before. It is to be noted that the tooth forming portion 74 of the die between the tooth root forming projections is also slightly tapered, as at 84 at the exit section of the die 64. The purpose of the relief at 84 is the same as that for the relief 78.

The part 44 is merely a spacer — it spaces the die member assemblies 42 and 46 and has a central circular opening of such size to not interfere with the metal forming operation.

The finish die member assembly 46 is similar to the assembly 42 in that it is a ring member 85 retained in a holder 86. The inner periphery has tooth root projections 88 thereon which are tapered in a lead-in section 90, uniform in a central finish section 92, and relieved or reversely tapered in an exit portion 94. The outside and finished teeth are formed against the surface 96 of the die. The die 85 finally sizes the sprocket to the desired form. The spacer 48 functions to space the die member assembly 46 from the stripper mechanism 50; it is provided with a circular central opening so as to not interfere with the metal forming operation.

Below the die assemblies 42, 46 there is provided a stripper mechanism 50 having a plurality of inwardly radially extending stripper plungers 100 resiliently urged inwardly toward the workpiece. Each plunger 100 is provided with a face 102 tapered to permit passage of the formed sprocket 10 but engageable with the rim of the sprocket 10 to strip it from the male die 22. An opening 104 is provided in the member 50 to permit discharge of the formed sprocket 10; there being a discharge plunger 106 operable to move the formed sprocket 10 through the opening 104.

As previously stated, the die member 38 is positioned on the base 54. The die 38 is surrounded by a ring 108 which is resiliently urged toward the male die 22 and level with the top of base member 54 to insure ease of removal of the finished sprocket.

The press arrangement 24, shown in FIG. 3 for purposes of illustration includes a hydraulic cylinder 118 having a piston 120 connected to the male die 22 and operable by a valve 122 connected to a hydraulic pump 124 which is connected to a sump 126. The valve is operated by a solenoid 128 connected to a timer 130 or to a control panel for manual operation. The pump 124 is driven, for example, by an electric motor which is also connected to the timer 130. By supplying hydraulic fluid from the pump 124 to the top of the piston 120, the male die 22 is moved downwardly to form the sprocket 10. Upon reversing the stroke, by reversing the fluid flow by means of the valve 122, the male die member 22 moves upwardly, the formed sprocket is stripped by means of the members 100 and rests on the ring 108. The plunger 106, is connected to the piston 132 in a hydraulic cylinder 134 connected to a valve 136 operated by a solenoid 138 connected to the timer 130. Fluid is supplied to the cylinder 134 through the valve 136 by a pump 140 driven by an electric motor connected to the timer 130. The pump pumps hydraulic fluid from the sump 126. Thus after the finished sprocket 10 is formed, the male die member is moved upwardly and the cylinder 134 is energized to move the plunger 106 so as to eject the sprocket 10 through the opening 104. The entire sequence can be controlled by the timer 130 or manually in any suitable manner.

If desirable, mechanical means may be provided to feed discs to the die for forming. Such is within the skill of one in the art.

We claim:

1. A die formed sprocket or gear constructed of one piece of metal and having a tooth portion and a hub portion, the thickness of the tooth portion being substantially uniform longitudinally of the teeth joining the hub portion and being different from the thickness of the hub portion.

2. A die formed sprocket or gear as in claim 1 wherein the thickness of the tooth portion is less than the thickness of the hub portion.

* * * * *